Patented Oct. 13, 1925.

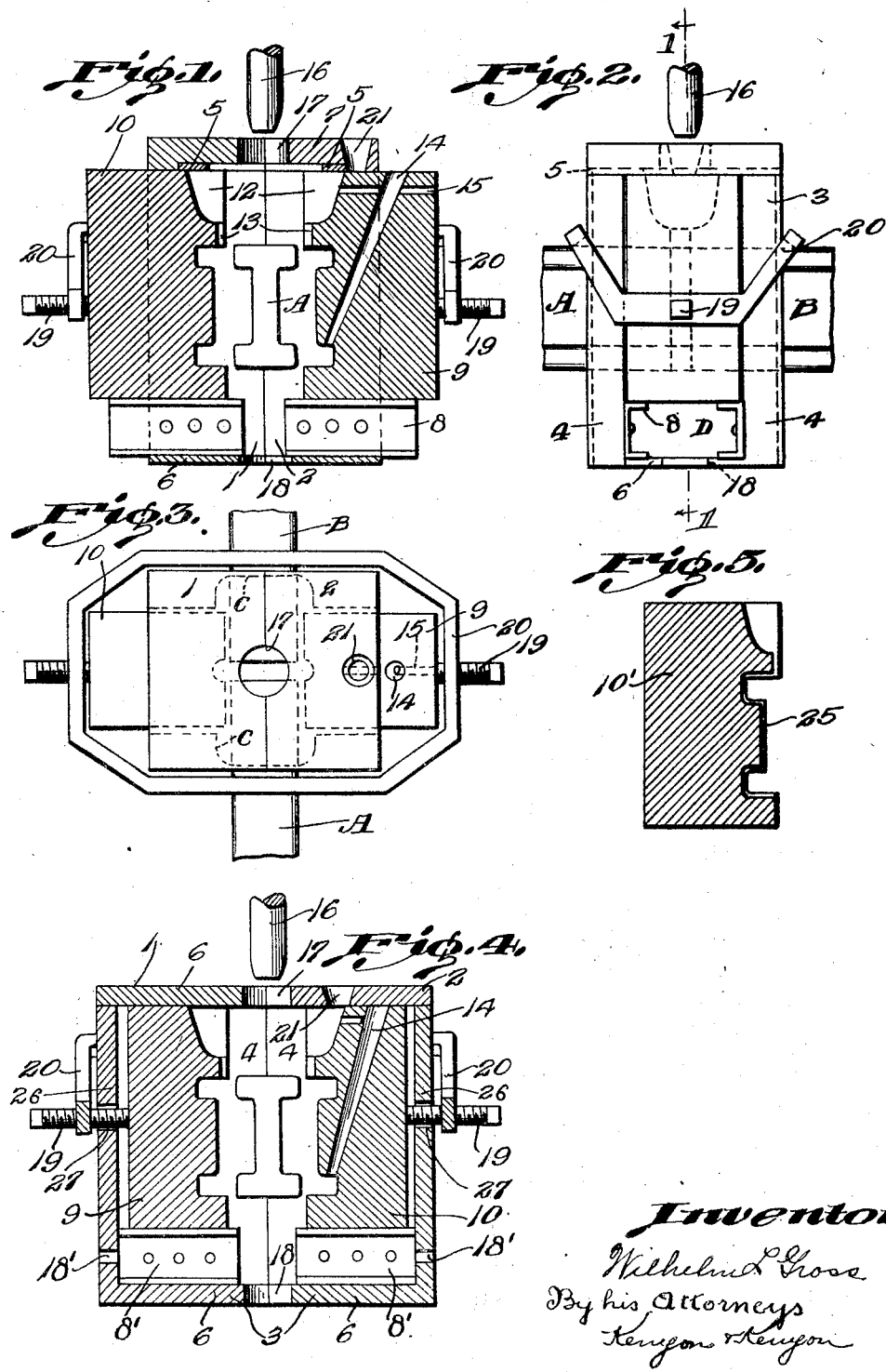

1,557,453

UNITED STATES PATENT OFFICE.

WILHELM L. GROSS, OF BERLIN, GERMANY, ASSIGNOR TO HUGH G. SPILSBURY, OF ROSELLE PARK, NEW JERSEY.

METHOD AND APPARATUS FOR MOLDING AND WELDING.

Application filed December 18, 1922. Serial No. 607,506.

*To all whom it may concern:*

Be it known that I, WILHELM L. GROSS, a citizen of Germany, and a resident of Berlin, Germany, have invented certain new and useful Methods and Apparatus for Molding and Welding, of which the following is a specification.

My invention relates to a process and apparatus for molding and welding and particularly to such cases where the dimensions of the mold or the cast parts are very small. It is immaterial, however, whether the internal volume of the mold is divided or whether it contains a core or cores or parts to be joined together by welding or the like.

Where there are parts of the mold that are of small dimensions or where it is desirable to weld surfaces together, as by the aluminothermic process in which case it is desirable to reduce to a minimum the amount of molten metal added to which end the surfaces to be joined are brought into close proximity, it is necessary that the mold or the surfaces to be joined by welding or both shall be brought to a high temperature before the introduction of the molten metal for casting or welding or both. In welding by the aluminothermic process the molten metal may have a high degree of super-heat and if enough of it is introduced between and about the surfaces to be joined to bring those surfaces to a welding temperature the quantity of heat introduced into the mold is likely to injure the texture and quality of the metal of the parts to be joined. For this reason and in order to reduce expense it is desirable therefore to reduce the amount of aluminothermic metal introduced to the smallest quantity consonant with good practice. In order to reduce the necessary initial temperature of the molten metal for either simple casting or for welding where the dimensions of the weld or cast part are small and in order to reduce the amount of welding metal required, the mold, and in the case of welding, the surfaces to be joined, or both, should be brought to as high a temperature as is practicable.

Preheating of the mold or of surfaces to be joined is preferably carried out by a blast flame but the development of such a flame requires a greater volume of space than is available in small molds or in cases where the use of a small amount of aluminothermic material is an end sought in welding. Furthermore it is only by having combustion take place in close proximity to the mold or parts to be joined that they may be heated to a temperature high enough to permit of the welding of surfaces that are in close proximity and without undesirable excessive use of aluminothermic metal or permit of the making of castings of small dimensions. To secure the proper degree of preheating, that is by having combustion take place in proximity with the surfaces to be heated the mold, whether it is for casting parts of small dimensions or whether it is for use in joining surfaces, the mold may be made in two or more parts that are separable and the preheating is carried on while these parts are sufficiently spaced to permit a free circulation over the surfaces of the mold or the parts to be joined or both of the gas or other preheating agent. To this end a chamber may be provided in which the mold parts alone or the mold parts as well as the surfaces to be joined are enclosed. The preheating is carried on within this chamber while mold parts are spaced from one another or from the surfaces to be joined a sufficient distance to permit free circulation of the preheating medium. The mold parts, certain of which may comprise the inner surfaces of the preheating chamber are then moved into casting relation with one another or with the parts to be joined or both and they are then ready for the introduction of molten metal into the mold or between the surfaces to be joined or both. The mold parts may also constitute movable walls of the chamber so that they may be readily manipulated from the outside of the chamber or mold parts within the chamber may be manipulated through holes in the walls thereof.

In addition to the practical advantages set forth in or readily apparent from the above statement a great advantage lies in the fact that it is not necessary to remove the preheating chamber from the parts to be joined or from around the mold parts while the mold is being assembled or brought into proper relation with the surfaces to be joined that have been preheated; and loss of heat by exposure is therefore completely avoided. The preheating may be continued even after the mold parts are brought into casting relation as well as during the time when the parts are sufficiently spaced for the development of the preheating flame.

Other and further objects and advantages of my invention will appear from the following description of one embodiment of my invention which is given in detail in order that my invention may be fully disclosed and understood.

In the drawings in which like reference characters indicate similar parts

Fig. 1 is a cross-sectional view on the line 1—1 of Fig. 2 of a mold embodying and capable of being used in the practice of my invention.

Fig. 2 is a view taken from the left side of Fig. 1.

Fig. 3 is a view taken from the top of Fig. 2.

Fig. 4 is a view showing certain modifications in the apparatus shown in Fig 1.

Fig. 5 is a view showing modifications of a mold member.

With the understanding that the specific embodiment shown in the drawings and hereinafter described is set forth in detail for the purpose of more fully disclosing my invention and its application without limiting my invention thereto or otherwise than as defined by the claims, the problem of uniting two sections of a girder is considered.

When it is desired to join two sections of a girder or rail by what is known as buttwelding as by pouring between them iron heated to a high temperature, it is necessary that the surfaces to be joined shall be preheated to a very high degree, approximately welding temperature, so that the metal introduced between the surfaces to be joined will not be chilled before it becomes welded and so that ribs or extensions will not have to be cast around the ends to be joined either for the purpose of strengthening the joint or for the purpose of introducing enough metal to carry into the mold a sufficient quantity of heat to assist in the welding operation by raising the temperature of the surfaces to be joined. It will therefore be apparent, that in carrying out my process with my apparatus, the surfaces to be joined may be placed very close together and the molten metal introduced into the mold may be confined substantially to the space between the surfaces whereby the occurrence of ribs which I have found to be unnecessary for strength and which greatly increase the cost of a joint is obviated. If the mold is placed in position before preheating it is necessary that it shall have a greater content than the mere space between the surfaces to be joined in order that the preheating flame may develop in proximity to those surfaces so as to bring the surfaces to a high enough temperature to be welded. But when the mold is large a proportionately greater quantity of molten metal is required. Though heating of the surfaces to be joined is effected by the greater quantity of metal the expense is increased and the parts to be joined or added to may be injured. If the mold is not large enough to permit development of the combustion that effects the preheating, a mere blast of hot gas is carried in to the mold and this will not effect a preheating to a sufficiently high degree. The same is true if the preheating chamber is not substantially enclosed.

The sections A and B of a girder that are to be joined are brought into close proximity as shown in Fig. 2. Sections 1 and 2 of a frame 3 are placed on opposite sides of the rail so that they are unregistered. The end plates 4 of each section comprise a metallic frame filled with asbestos, or some equivalent construction, shaped to provide cavities C. The opposed edges of these end sections 4 are formed to closely fit the profile of the rail as shown in Fig. 1. Members 5 extend between the top edges of the end members 4 and the bottom edges are connected by a member 6. A top member 7 which may comprise a metal frame filled with asbestos or equivalent construction is formed to accommodate members 5 as it rests upon the end members 4. Channel bars 8 are fastened to the end members 4 and upon them slide the mold parts 9 and 10. The opposed faces of the mold parts are formed as shown in Fig. 1 to correspond substantially with the profile of the parts to be joined, for example, the sections A and B of the girder. The opposed faces of the mold members 9 and 10 are also provided with cavities 12 and passages 13, the purpose of which is hereinafter more fully described. The mold member 9 is provided with a pouring gate 14 which leads as shown to the bottom of the mold and which is connected to one of the cavities 12 and which has an overflow 15.

The girder sections A and B being in close proximity, it is necessary that the chamber in which they are enclosed during the preheating operation, shall be substantially enclosed, that it shall be large enough to permit the free development of the combustion of the preheating agent, and that it shall permit a preheating agent to be introduced into it. The mold sections 9 and 10 are therefore moved to the position shown in Fig. 1 wherein they are spaced from the girder sections and a nozzle 16 introduces a blast flame, for example, a flame produced by benzol or gasolene through the opening 17 in the top member 7 and the products of combustion pass out between the channel plates 8 or through the opening 18 in the bottom plate 6. After preheating has been continued until the parts to be joined are preferably at welding temperature at which time the surfaces of the mold will be highly heated, the mold sections 9 and 10 are pressed inwardly into engagement with one another and the rail sections A and B by means of the screws 19 or equivalent devices which pass through the encircling member 20, and the cavities C and D are filled with sand perhaps slightly moist. This movement will bring the gate 14 into register with the pouring hole 21 in the cover 7, and molten metal, for example, that produced by the aluminothermic process, can be introduced between the surfaces to be joined. It may not be necessary that the metal shall rise to the top flange of the girder or rail but it may even pass through the riser formed by the grooves 13 into the cavity 12. It will thus be seen that a preheating chamber of ample proportions is first provided and then that the heated walls of this chamber are used to confine the molten metal to substantially the space between the surfaces to be joined. It will also be apparent that in accordance with my process and by the use of my apparatus it is unnecessary to expose the preheated parts after preheating has taken place, and there is therefore no loss of heat and the temperature of the parts can be maintained sufficiently high.

It will also be apparent that the operation and method described are equally applicable in the event that there is no work-piece, e. g., the rail sections A and B, and the preheating of the mold can be attained where castings of very small dimensions are to be made. Preheating in any event may be continued up to the last instant, so that all cooling is avoided. Furthermore, the interior of the mold and any work-pieces therein, remain readily accessible so that any treatment that can be applied to them, prior to the pouring of the metal and so that they may be cleaned or rectified or so that any other substance may be introduced.

As an example of the use of my method and apparatus for making of castings of small dimensions it is perfectly obvious that the opposed faces of the mold parts 9 and 10 or of equivalent parts in any number may be formed with any desirable contour and that it will be possible to preheat such opposed faces to such a high degree that castings of extremely small dimensions may be perfectly made. As an example of possible modifications of the opposed faces of the mold the parts 9 and 10, there is shown in Fig. 5 a mold part wherein a groove 25 is formed while the mold part is given a profile identical to the profile of a workpiece, for example a girder part A. The use of such a mold part or of similar mold parts instead of mold parts 9 and 10 in Fig. 1 would result in the formation of a rib or strap around the girder at the joint. Such a rib or strap while not necessary when welds are made in accordance with my invention might be desirable in certain cases since additional metal is thereby added for a possible strengthening or to effect the introduction of additional heat quantities into the welding mold. The rib may be made of any width or thickness by changing the dimensions of the groove 25. If a core similar in shape to the girder A were used in connection with molds having these grooves 25, a small ring having a general outline of the profile of the part A would be produced.

It is perfectly obvious that parts having any profile may be joined by changing the shape of the opposed edges of the end members 4 of the frame. And it is perfectly obvious that instead of joining two parts my process may be used to cast metal on to a previously prepared article. For example mold parts 9 and 10 having a groove 25 could be used for casting a ridge around a girder.

A further example of apparatus embodying my invention that may be used in practice thereof is shown in Fig. 4 where instead of having a frame upon which are mounted heat confining end members 4 and top and bottom members 6 and 7 respectively a complete box is provided that has heat confining side members 26. The side members 26 are provided with openings 27 through which the screws 19 carried by the encircling member 20 or any other equivalent device may be operated to shift the mold members such as 9 and 10 from spaced preheating position into casting position. Products of combustion escape through openings 18 and 18′.

It is understood that if it is necessary to make the mold parts fit any work-piece or core more snugly when they are placed in casting position, sand or clay may be used for that purpose. The removability of the top section 6 of the chamber facilitates such treatment or inspection of the mold or work-piece or both.

It is to be noted that by the use of my apparatus and the practice of my invention it is possible to preheat any part to which metal is to be added or which is to be joined to another part to such a high degree that a perfect joint may be made by a pure interstitial casting of welding metal such as produced by the aluminothermic process and that it is unnecessary to cary additional metal into the mold to supply additional heat. Such additional heat would only produce unnecessary ribs and add to the expense of the joint. Nor is it necessary to enlarge the mold cavity around the joint for the purpose of permitting circulation of the preheating agent as such circulation is permitted by the spacing of the mold parts. The confining of the welding metal to the space between the surfaces to be joined or substantially to that space results in great economy.

What I claim as new and desire to secure by Letters Patent:

1. The process of adding metal to a part, which consists in enclosing said part in a chamber an inner wall of which is movable and shaped to provide a mold, preheating the part to be added to while said wall is spaced therefrom, moving said wall into proximity with said part and introducing molten metal into the mold so formed.

2. The process of joining metal parts, which consists in enclosing the surfaces thereof to be joined in a chamber of which inner walls are movable and shaped to provide a mold, preheating said surfaces while said walls are spaced from said parts, moving said walls into proximity with said parts and introducing molten metal between the surfaces to be joined.

3. The process of adding metal to a part, which consists in enclosing said part in a chamber an inner wall of which is movable and shaped to provide in conjunction with said part a mold for molten metal, preheating the part to be added to while said wall is spaced therefrom, moving said wall into engagement with said part to form therewith a mold and introducing molten metal into the mold so formed.

4. The process of joining metal parts, which consists in enclosing the surfaces thereof to be joined in a chamber of which inner walls are movable and shaped to provide in conjunction with said parts a mold for cast metal, preheating the surfaces to be joined while said walls are spaced to provide a chamber of sufficient volume around said parts to permit free circulation of gas, moving said walls into engagement with said parts to form therewith a mold, and introducing molten metal between the surfaces to be joined.

5. The process of joining metal parts, which consists in enclosing the surfaces thereof to be joined in a chamber of which inner walls are movable and shaped to correspond substantially with the profile of said parts, preheating the surfaces to be joined while said walls are spaced from said parts, moving said walls into engagement with said parts, and introducing molten metal between the surfaces to be joined.

6. The process of joining metal parts which consists in enclosing the surfaces to be joined in a chamber having movable walls, preheating said surfaces while said walls are sufficiently spaced to provide for free circulation of gas about the surfaces to be joined, moving said walls into proximity to the parts to be joined, and introducing molten metal between said surfaces.

7. The process of joining metal parts which comprises placing the faces thereof to be joined in spaced relation, enclosing said faces in a chamber having walls shaped to provide when in contact with said parts a mold space between said faces and movable away from said parts to form a chamber around said parts, preheating said parts while said walls are spaced therefrom, moving said walls into contact with said parts to form said mold space and introducing molten metal into the mold space so formed.

8. The process of joining metal parts which consists in enclosing the surfaces thereof to be joined in a chamber of sufficient volume to permit free development of combustion of a preheating agent in close proximity to the surfaces to be joined, introducing a preheating agent into said chamber to thereby preheat said surfaces and certain of the walls of said chamber, introducing molten metal between said surfaces, and by movement of said preheated walls toward the edges of said surfaces confining said molten metal while fluid to substantially the space between said surfaces.

9. The process of joining metal parts which consists in enclosing the surfaces thereof to be joined in a chamber of sufficient volume to permit free development of combustion of a preheating agent in close proximity to the surfaces to be joined, introducing a preheating agent into said chamber to thereby preheat said surfaces and certain of the walls of said chamber, moving certain of the walls of said chamber into contact with said parts at substantially the edges of the surfaces to be joined and introducing molten metal between the surfaces to be joined.

10. The process of joining metal parts which consists in enclosing the surfaces thereof to be joined in a chamber of sufficient volume to permit free development of combustion of a preheating agent in close proximity to the surfaces to be joined, introducing a preheating agent into said chamber and thereby preheating the surfaces to be joined to substantially welding temperature, introducing molten metal between the surfaces to be joined, and confining said molten metal while fluid to substantially the space between the surfaces to be joined.

11. The process of weld casting which consists in preheating the mold and work-piece while the mold is spaced from the work-piece, moving the mold into casting relation with the work-piece, and introducing molten metal thereinto.

12. The process of joining metal parts which consists in placing mold sections in spaced relation to said parts, introducing a heating medium into the space so provided, bringing the mold sections into casting relation with said parts, and introducing molten metal into the mold.

13. The process of adding metal to a part which consists in placing a mold in spaced relation to said part, introducing a heating medium into the space so provided, bringing the mold into casting relation with said part, and introducing molten metal into the mold.

14. In combination, a mold comprising a plurality of parts relatively shiftable into spaced or casting relation, means for preheating said parts while in spaced relation, a frame supporting said parts and substantially enclosing the space between them when they are in spaced relation, and means for moving said parts in said frame into casting relation.

15. In combination a mold comprising a plurality of relatively shiftable parts, a frame supporting and substantially enclosing said parts and heat confining means supported by said frame.

16. In combination a mold comprising a plurality of relatively shiftable parts, heat confining means supporting said parts and means for heating said parts, said heat confining means permitting of inspection of said parts.

17. In combination a mold comprising a plurality of relatively shiftable parts, heat confining means supporting said parts and means for holding said parts in casting relation.

18. In combination a mold comprising parts movable into spaced relation or casting relation, a frame supporting said parts for movement and closing the space formed when said parts are in spaced relation except for an inlet and outlet for preheating medium.

In testimony whereof, I have signed my name to this specification.

WILHELM L. GROSS.